United States Patent

[11] 3,630,374

[72] Inventor Joseph John Russo
9191 Torresdale Avenue, Philadelphia, Pa. 19114
[21] Appl. No. 864,915
[22] Filed Oct. 8, 1969
[45] Patented Dec. 28, 1971

[54] OIL FILTER CARTRIDGE
4 Claims, 5 Drawing Figs.
[52] U.S. Cl. .................................................. 210/232, 210/238, 210/314, 210/439, 210/494
[51] Int. Cl. ................................................. B01d 29/06, B01d 27/08
[50] Field of Search ........................................ 210/232, 314, 439, 494, 236, 238

[56] References Cited
UNITED STATES PATENTS
2,197,252 4/1940 Decker .................... 210/494 X Primary Examiner—Frank A. Spear, Jr.
Attorney—Karl L. Spivak ABSTRACT: An oil filter cartridge including a coarse filter element and a fine filter element in vertically juxtaposed relation, each wound about a common central core and enclosed with a cylindrical cardboard cover, the said cover being provided with slits to permit easy insertion of the coarse and fine filter filtering elements and the said cover further being provided with openings to permit the passage of oil therethrough at predetermined locations.

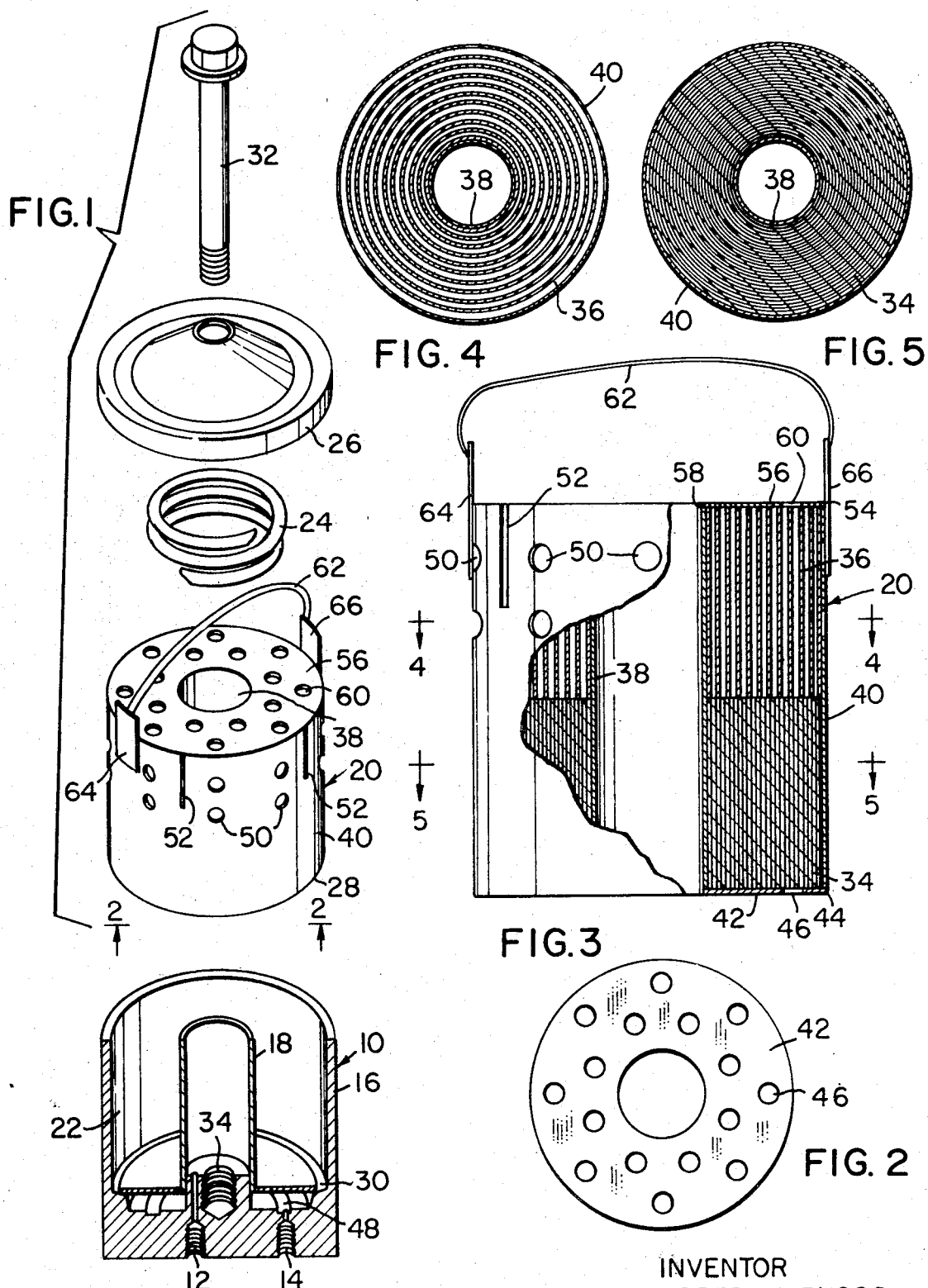

3,630,374

OIL FILTER CARTRIDGE

BACKGROUND OF THE INVENTION

This invention relates in general to the art of oil filters and oil cleaners, and more particularly, is directed to improvements in oil filter cartridges especially suitable for use with oil cleaners of the bypass type commonly in use with internal combustion engines.

Prior art oil filter cartridges have generally comprised devices which include a cartridge container and a filter element in cartridge form which is insertable into and removable from the container. Most prior art oil filters were positioned in inaccessible locations and generally presented a relatively dirty job when it became necessary to replace the filter element. In addition, the prior art oil filter cartridges usually included construction that was relatively expensive in manufacture and costly in installation and replacement. Additionally, previously known oil filter cartridges presented problems in efficiency wherein after a given period of use, the ability of the filter element to entrain impurities was greatly reduced, thereby permitting considerable contamination of the oil until such time as the filter element was replaced. Other prior art filter cartridge devices of which I am familiar included items of inexpensive materials but which had a tendency to swell after a period of use and thereby lodged within the oil filter itself. Such devices usually lacked adequate means for removing the used cartridge element and thereby presenting a messy and exasperating experience to the user at times when cartridge replacement became necessary.

SUMMARY OF THE INVENTION

The present invention seeks to improve over all previously known devices by providing an oil filter cartridge that includes means for easily and cleanly removing the cartridge element after a period of use. Further, the present oil filter cartridge includes a cylindrical filter element cover that is relatively impervious to the passage of oil and that is fabricated of material of sufficient body to withstand the rigors of oil filter use without swelling, binding or otherwise locking within the oil filter unit itself. In the interest of economy and efficiency in operation, the filtering elements are divided into a rough filter section which may be a rolled web of absorbent material and a fine filter section which may be a roll of highly compressed cellulose web material. The entire filter cartridge is designed and sized to conveniently fit within an oil cleaner of the bypass type such as disclosed in U.S. Pat. No. 3,346,120, dated Oct. 10, 1967.

By employing the present oil filter cartridge, it has been found that the widely accepted practice of changing crankcase oil in an automobile and in other motor vehicle engines may now be completely abandoned with utmost safety and efficiency. Further, the present oil filter cartridge improves over previously known and used rolled tissue filter elements in that a complete, self-contained cartridge has herein been provided that is inexpensive in manufacture and of sufficient strength to adequately serve the purpose without swelling, binding or otherwise failing during the normal life cycle of the oil filter. The present filter cartridge element improves over previously known filter cartridge elements in that for the first time, a single element has been constructed having both a fine filter section and a coarse filter section to thereby provide longer periods of filter element life by conveniently separating the coarse impurities from the oil prior to final filtering.

It is therefore an object of the present invention to provide an improved oil filter cartridge of the type set forth.

It is another object of the present invention to provide an oil filter cartridge that includes both a coarse filter section and a fine filter section wound about a common central core.

It is another object of the present invention to provide a novel oil filter cartridge that includes a double filtering element contained within a cylindrical, substantially oil-resistant enclosure.

It is another object of the present invention to provide a novel oil filter cartridge that includes novel cartridge fabricating means and means to enter and exit oil from the cartridge enclosure.

It is another object of this invention to provide an oil filter cartridge that may be readily installed for operation with an engine oil cleaner without the use of special tools, special skills, special knowledge and all without any soil or other mess.

It is another object of the present invention to provide a novel oil filter cartridge that is rugged in construction, inexpensive in manufacture, and trouble-free in operation.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is an exploded perspective view, partially broken away, showing the operating parts.

FIG. 2 is a sectional view taken along line 2—2 of FIG. 1, looking in the direction of the arrows.

FIG. 3 is a side elevational view of the dual element filter cartridge, partially broken away to expose the internal construction.

FIG. 4 is a cross-sectional view taken along line 4—4 of FIG. 3, looking in the direction of the arrows.

FIG. 5 is a cross-sectional view taken along line 5—5 of FIG. 3, looking in the direction of the arrows.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings, and are not intended to define or limit the scope of the invention.

Referring now to the drawings, I show in FIG. 1 an oil cleaner unit 10 having bottom positioned oil inlet 12 and oil outlet 14 openings provided therein in accordance with the teachings of my copending patent application entitled "Oil Cleaner" filed Oct. 10, 1968, Ser. No. 775,987, now U.S. Pat. No. 3,526,590. The oil cleaner 10 includes a cylindrical body 16 and a fixed cylindrical core 18 to receive the dual element filter cartridge in oil filtering relation as hereinafter more fully set forth. The filter cartridge 20 is sized to slidingly insert within the oil cleaner chamber 22 and over the fixed core 18 in well-known manner to facilitate flow of untreated oil upwardly through the interior of the cylindrical core 18 and thence downwardly through the filter elements for oil filtering purposes in well-known manner. The fully treated oil exits the oil cleaner 10 through the oil outlet bottom opening 14 for reuse with the engine (not shown).

A coil spring 24 biases between the filter cartridge 20 and the bottom of the oil cleaner lid 26 to thereby press the peripheral bottom edge 28 of the filter cartridge 20 against the bottom interior shoulder 30 which is provided within the oil filter chamber 22. The positive oil seal between the bottom peripheral edge 28 of the filter cartridge 20 and the bottom of the oil cleaner chamber 22 serves to force the previously treated oil through the bottom oil outlet opening 14. The bolt 32 threadedly engages within the threaded socket 34 and functions both to positively seal the lid 26 against the top of the oil cleaner body 16 and also to seal the peripheral bottom edge 28 of the filter cartridge against the peripheral bottom shoulder 30 as hereinabove set forth by utilizing the compression forces of the coil spring 24.

As best seen in FIGS. 1 and 3, the filter cartridge 20 comprises a fine filter element 34 and a coarse filter element 36 wound about the common cylindrical core 38 and formed concentric therewith to provide a substantially cylindrical dual filter cartridge configuration. The filter elements 34, 36 may be of any fibrous, absorbent material that may be readily wound about the core 38. Absorbent material such as rolled webs of coarse compressed cellulose are employed as the coarse filter element 36. The fine filter element 34 is fabricated from a web of absorbent, highly compressed, cellulose material. The coarse filter element 36 is normally more loosely wound about the core 38 than the fine filter element 34 to thereby serve to entrap large impurities, oil contaminants or other foreign materials entrained within the oil (not shown). The fine filter element 34 tightly winds about the core 38 immediately beneath the coarse filter element 36 and functions to filter smaller impurities of size permitting passage through the coarse filter element 36. In this manner, most of the filter element damaging materials strand upon the coarse filter element 36 to thus permit unusually long life and greatly increased periods of efficient operation of the combined filter cartridge 20. If desired, the coarse filter element 36 may be fabricated of a coarse web of absorbent material such as paper towels to cooperate with a tightly wound web of fine filter material to provide a unitary filter element having a coarse and fine filter material in vertical juxtaposed relation.

Both the fine filter element 34 and the coarse filter element 36 wind about the common cylindrical core 38 and sufficient material is employed to wind each element 34, 36 to the same cross-sectional dimensions. The elements 34, 36 position in vertically abutting, juxtaposed relation to thereby encourage the downward passage of oil from the coarse filter element 36 through to the fine filter element 34. A cylindrical casing 40 of substantially oil retaining construction such as flexible, relatively dense cardboard or oil resisting plastic or metallic construction encloses the filter elements 34, 36 and serves to also direct the flow of oil downwardly through the element 36 and the fine filter element 34 within the casing for oil cleaning purposes. A generally circular bottom 42 peripherally secures to the bottom edge 44 of the casing 40 in a substantially oiltight circular junction in well-known manner, for example, by utilizing an oil impervious cement. A plurality of holes 46 perforate the casing bottom 42 to permit the exit of treated oil from the filter elements 34, 36 therethrough for collection in the oil cleaner circular bottom recess 48 and thence through the bottom oil outlet 14 in the usual manner. The holes 46 space about the bottom construction in a random pattern to thereby permit unrestricted flow of oil from the filter cartridge 20.

Referring now to FIGS. 1 and 3, the upper portion of the casing 40 is shown punched at regular spaced intervals to provide a plurality of oil passage openings 50 for oil inlet and outlet purposes. The openings 50 peripherally overlie the coarse filter element 36 and facilitate the interchange of oil through the element. The casing 40 is unpierced about the periphery of the fine filter element 34 to thereby assure that all treated oil flows through the element 34 and exits downwardly through the bottom openings 46 after being fully treated. A plurality of elongate slit openings 52 downwardly split the casing 40 from the top edge 54 to a depth equal to approximately one-half the height of the coarse filter element 36. I prefer to employ a plurality of not less than 4 equally spaced slit openings 52 which are peripherally spaced about the top of the casing 40 to facilitate insertion of the round filter elements 34, 36 within the casing 40 during the fabrication process. I have found the filter cartridge 20 is most efficient when there is a tight peripheral bond between the outside layers of the filter elements 34, 36 and the inside of the casing 40 to thus prevent bypassing of the oil between the filter elements 34, 36 and the casing 40 which would result in reduced filter efficiency.

In view of the fact that it is desirable to secure as tight a fit as possible between the filter elements and the casing, the splits 52 facilitate insertion of the round filter elements 34, 36 into the casing by permitting the top portions of the casing to flair outward slightly during the filter insertion process to thereby permit insertion of the filter elements without binding against the top edge 54 of the casing 40. It will be appreciated that as the filter elements 34, 36 insert within the casing 40, the split openings 52 widen and thereby permit the top section of the casing to flair outwardly to thus serve a funnellike purpose in fabricating the cartridge. Once the elements 34, 36 fully position within the casing 40 and the fine filter element 34 bottoms against the casing bottom 42, the split opening 52 will naturally close to redefine a perfect cylindrical shape for the casing 40. Additionally, the application of the casing top 56 further aids in restoring the casing cylindrical shape.

A casing top 56 of cardboard construction and configuration similar to the casing bottom 42 peripherally cements to the top edge 54 of the casing and the top edge 58 of the cylindrical core 38 in substantially oil tight circular connections. A plurality of top openings 60 randomly pierce the top 56 to provide a plurality of oil passage holes to permit oil to flow from the oil inlet 12 through the cylindrical core 18 and thence downwardly through the holes 60 for oil treatment purposes at the filter elements 36, 34. It will be appreciated that the cemented circular junctions at the top edge 54 of the casing and the top edge 58 of the core 38 function to retain the split openings 54 in closed position to thereby maintain the cylindrical configuration of the casing 40 after insertion of the filter elements 34, 36 and during all periods of normal operation.

A top band 62 of relatively strong paper diametrically affixes to the outside of the casing 40 near the top thereof through the use of glued tabs 64, 66 to facilitate removal of the used filter cartridge after it has served its intended life of filter operation. It will be noted that the band 62 positions above the top of the casing 40 to thereby permit easy removal of the filter cartridge 20 without soiling the hands or requiring the use of any special tools whatsoever. Once the spent cartridge has been removed, a new cartridge may be installed within the oil cleaner 10 simply by inserting a new cartridge 20 over the cylindrical core 18 and then tightening the lid 26 into sealing position utilizing the threaded bolt 32 in well-known manner.

What is claimed is:

1. In a dual element filter cartridge for use within an automotive engine oil cleaner having a central spindle, the combination of
   A. a cylindrical core overfitting the said central spindle;
   B. a coarse filter element wound about one portion of the said core to define a first cylindrical roll;
   C. a fine filter element wound about a second portion of the said core to define a second cylindrical roll;
   D. a cylindrical casing enclosing the said first and second rolls,
      1. the said casing comprising a cylindrical sidewall terminating upwardly in a top edge and downwardly in a bottom edge and including a circular top and bottom respectively affixed to the said top and bottom edges,
         a. the said circular top and bottom being perforated to provide a plurality of oil passage openings, and
         b. the said cylindrical sidewall being perforated to provide a plurality of oil passage openings,
      2. the said casing being cut to provide a plurality of slits, each said slit being cut downwardly from the said sidewall top edge.

2. The invention of claim 1 wherein the said slits are equidistantly positioned about the periphery of the sidewall.

3. The invention of claim 2 wherein the said slits extend downwardly a distance less than the height of the said coarse filter element.

4. The invention of claim 3 wherein each said slit extends in a direction parallel to the longitudinal axis of the said core.

* * * * *